United States Patent [19]
Beser et al.

[11] 3,830,693
[45] Aug. 20, 1974

[54] GATE FOR CIRCULATION CONTROL IN NUCLEAR REACTOR USING CIRCULATING FUEL-ELEMENT BALLS

[75] Inventors: Ali Ekber Beser; Wolfgang Scholz, both of Essen; Rudolf Kaiser; Norbert Pohlig, both of Ettlingen, all of Germany

[73] Assignee: Fried. Krupp Gesellschaft mit beschrankter Haftung, Essen, Germany

[22] Filed: June 14, 1972

[21] Appl. No.: 262,682

[30] Foreign Application Priority Data
June 18, 1971  Germany.................... 2130220

[52] U.S. Cl................. 176/18, 176/30, 176/28, 251/159, 251/162, 251/174
[51] Int. Cl............................. G21c 19/02
[58] Field of Search................ 176/30–32, 176/28, 29, 17, 18; 251/159, 162, 161, 163, 170, 174

[56] References Cited
UNITED STATES PATENTS

| | | | |
|---|---|---|---|
| 1,738,450 | 12/1929 | Ryan et al. | 251/159 |
| 2,803,601 | 8/1957 | Cooper | 176/32 |
| 3,142,625 | 7/1964 | Wellborn | 176/32 |
| 3,195,857 | 7/1965 | Shafer | 251/170 |
| 3,214,131 | 10/1965 | Boldt et al. | 251/170 |
| 3,245,653 | 4/1966 | Lavigueur | 251/159 |
| 3,427,220 | 2/1969 | Rennie et al. | 176/18 |
| 3,653,631 | 4/1972 | Hurst | 251/159 |

*Primary Examiner*—Harvey E. Behrend
*Attorney, Agent, or Firm*—Karl F. Ross; Herbert Dubno

[57] ABSTRACT

A nuclear reactor having a circulation path in which fuel-element or fertile-material balls are circulated is provided with a gate or valve having a housing formed with an elongated throughgoing passage and a valve ball therein with a throughgoing bore alignable with the passage to permit throughflow and adapted to be oriented transverse to the passage axis to close the gate. The valve ball floats between two annular seals one of which is urged against the ball by a sleeve in turn biased by a spring resting on an annulus which rides on an eccentric or other cam arrangement. The housing is formed with a pair of bores transverse to the passage each of which contain a control rod a further rod and connected thereto via a double slider. One further rod is provided with a pair of pins loosely received in corresponding bores of the valve ball such that its rotation rotates the valve ball. The other second rod carries the eccentric which determines the force with which the seals grip the valve ball.

4 Claims, 2 Drawing Figures

GATE FOR CIRCULATION CONTROL IN NUCLEAR REACTOR USING CIRCULATING FUEL-ELEMENT BALLS

FIELD OF THE INVENTION

The present invention relates to a nuclear-material circulation system for a nuclear reactor. More particularly this invention concerns a gate for use in the circulation path of such a reactor in which the nuclear material (i.e. fuel or breeder elements) have the configuration of spheres or spheroids.

BACKGROUND OF THE INVENTION

Nuclear reactors are known in which fuel elements in the form of small spheres are circulated along a path. Such a system is described in U.S. Pat. No. 3,142,625 issued July 28, 1964 to W. W. Wellborn for NUCLEAR REACTOR PLANT WITH INSPECTION AND REPROCESSING STATIONS.

It is desirable to provide in such a circulation path, a gate or valve which can be operated to control both circulation of the elements and of the high-temperature gases also present in the path. It is known to use a ball as valve element in such a gate, with the ball formed with a throughgoing bore that may be aligned with the passage to open the gate and can be turned transverse thereto to close it. Seals are provided at the valve seats.

As such a valve is used its seals very rapidly wear out. Since the ball is usually fixedly mounted on the end of its actuating member without play except in the angular sense its seals must be biased separately against it to ensure a tight connection. Since the temperatures and pressures are often extreme, it is necessary that these seals press very tightly against the ball. This causes the seals to wear out rapidly, the seal which is most strongly pressed against the ball being the first to wear out.

OBJECTS OF THE INVENTION

It is, therefore, an object of this invention to provide an improved circulation system for a nuclear reactor using spherical fuel or breeder elements.

Another object is the provision of an improved gate for use in the circulation path of such a reactor.

Yet another object of the present invention is to provide a gate or valve which seals very tightly, yet is prone to only a nominal amount of wear.

Still another object of the invention is to provide an improved nuclear reactor whereby the aforementioned disadvantages can be avoided.

SUMMARY OF THE INVENTION

These objects are attained according to the present invention by providing the valve with a ball which is floatingly mounted between two annular polyimide seals which embrace it. One of the seals is urged longitudinally toward the other so that the floating valve ball rides with the same amount of friction on both seals. The displaceable seat is carried on a tube which fits coaxially in the passage of the housing constituting part of the fuel-element circulation path. Means is provided in the form of a cam or an eccentric to vary the amount of pressure this tube exerts against the seal.

According to another feature of this invention the pressure on the displaceable seal, and through it on the other seal, is decreased during rotation of the ball, and then restored to a high level to ensure a tight sealing.

According to a more specific feature of the invention, the gate is employed in a nuclear reactor having a high-temperature gas circulation path and operating at relatively high temperatures, the spheroidal elements containing a fissionable or fertile nuclear material such as thorium, uranium or plutonium compounds. The balls may be composed of a metal such as a zirconium or steel alloy or may be graphite bodies in which the nuclear material is encased or embedded.

Another feature of the present invention resides in the "floating" mounting of the ball or valve member which enables it to be rotated about an axis transversed to the duct in which it is received. The valve ball, which is of a diameter slightly greater than the bore diameter and equal to the duct diameter so as to be flush with the latter when the bore is aligned with the duct, thus has limited play in the axial direction of the duct and in the transverse direction, i.e. parallel to its axis of rotation. Thus when the sealing seats clamp the ball between them, they cooperate with the bore in a selfcentering manner (regardless of thermal expansion or contraction) and allow only one of the seats to be movable, the movable seat urging the ball against the stationary seats. The seats have spherical configuration and openings of the same diameter as the bore of the valve member.

According to another feature of the invention, the valve member and the movable seat are operated by a pair of rod assemblies or shafts extending parallel to one another in a common housing through passages extending between the duct and the exterior, the shafts for both the valve member and the movable seat being subdivided into a pair of rods interconnected by a double-slide coupling (having two coupling parts angularly interconnected but able to slide relative to one another in two mutually perpendicular directions transverse to the axis) to transfer rotary movement from the actuated rod portion to the operating rod portion while allowing some degree of disalignment of the two rod portions as a result of temperature variations. The movable seat is provided with a similar doubleslide coupling, the operating end of its rod portion being formed with an eccentric or cam for translating the angular displacement of the rod into an axial displacement of the movable seat.

According to another feature of the invention, the movable seat is provided on a sleeve axially shiftable in the duct and having a tubular portion terminating in a shoulder spaced from the movable seat. The cam or eccentric acts upon a tubular slide surrounding the tubular portion and biasing a spring against the shoulder. The spring also acts to maintain the pressure of the seat with thermal variations within the assembly. A seal is maintained between the tubular portion and the housing in spite of the axial displaceability of the tubular portion by a bellows arrangement.

DESCRIPTION OF THE DRAWING

The above and other objects, features, and advantages will become apparent from the following description, reference being made to the accompanying drawing in which.

SPECIFIC DESCRIPTION

Figures 1, 2:
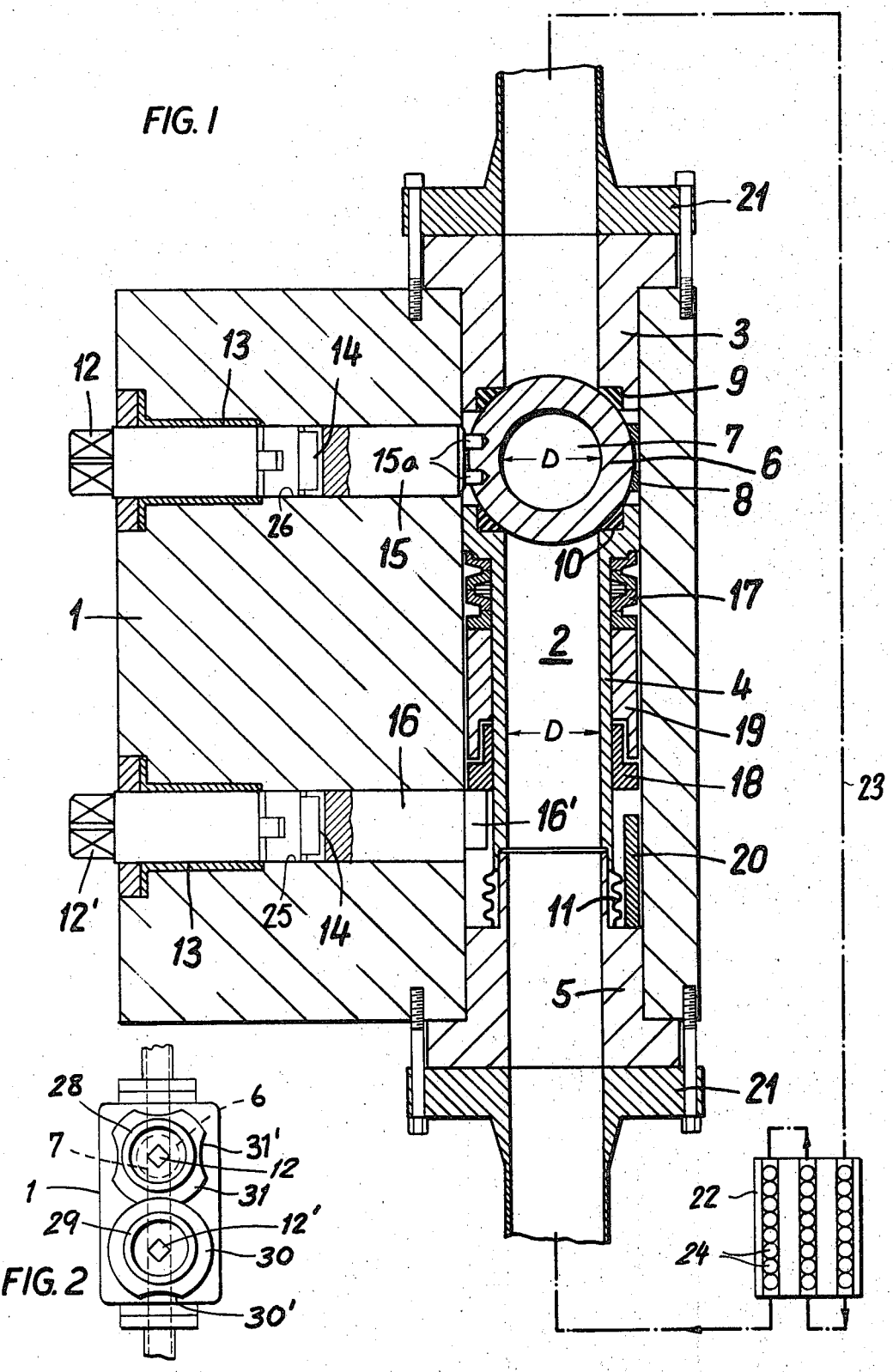
FIG. 1 is a vertical section through the gate according to the present invention.
FIG. 2 is a side view of the gate, in reduced scale.

As shown in FIGS. 1 and 2 a housing 1 is formed with a throughgoing elongated passate 2 which is connected via pipes 21 to the fuel-element flow path 23 of a high-temperature nuclear reactor 22 which uses balls 24 as fuel elements as described in the above-mentioned patent or as breeder elements when the balls contain a fertile material rather than a fissionable fuel.

A valve body in the form of a perfectly spherical ball 6 is provided in the passage 2. This ball 6 has a throughgoing cylindrical bore 7 which is of the same diameter D as the passage 2. Two polyimide seals 9 and 10, axially spaced from each other in the passage 2 are provided which embrace the ball 6. In addition a seat washer 8 is provided on one wall of the passage 2 for seating the ball 6.

The seal 9 is circular and carried on the end of a tubular element 3 which is fastened on under the end of the upper pipe 21. The other seal 10 is carried on a tube 4 which is axially displaceable in the passage 2. A further element 5 is provided which, like the element 3, is bolted on under the flange of pipe 21.

Two bores 25 and 26 extend at right angles to the bore 27 which houses the elements 3, 4, and 5 which define the passage 2. The upper bore 26 receives two rods 12 and 15 having confronting slotted ends joined by a double-slider 14 coupling (cardan, ball or other universal joint). A seal 13 very closely surrounds the outer control rod 12. The rod 15 is provided with a pair of axially projecting pins 15a which are loosely received in corresponding blind bores formed in the ball 16 at right angles to the bore 7. Thus rotation of rod 12 by means of a handwheel 28 rotates the valve ball 6 from the closed-valve position of FIG. 1 to the open position of FIG. 2 and back.

A similar seal 13 and slider 14 (universal joint with limited axial relative movement) are provided in the bore 25 for another control rod 12' and rod 16. This rod 16 is provided on its end toward the passage 2 with an eccentric projection 16' that extends into the bore 27. A tubular element 18 fitted around the tube 4 and bearing axially on another such element 19 which in turn bears through a resilient stack of belleville washers 17 on the tube 4 rests on the projection 16' and, on rotation of the rod 16 by means of a handwheel 29 about its axis, is displaced by the projection 16' toward or away from the ball 6 to compress the spring 17 more or less.

The lower end of tube 4 is connected via a flexible bellows-like cuff 11 to the member 5. In addition a stop 20 is provided which is engaged by the ring 18 in its position corresponding to the least stressed condition of spring 17.

In FIG. 1 the valve is shown in the closed position, with bore 7 transverse to passage 2. In order to open the valve, first rod 12' is rotated a half turn, through 180°, to bring a cutout 30' formed on a disk 30 carried on the handwheel 29 to a position to allow rotation of the rod 12 which carries a disk 31 formed with four equispaced cutouts 31'. Only one rod 12 can be rotated at a time, and the cutout 30' is arranged so that the rod 12 may only be rotated when the rod 12' is in a position corresponding to maximum destressing of the spring 17. Once this cutout 30' clears the disk 31 the handwheel 28 is rotated to turn the rod 12 a quarter turn, through 90°, in order to bring the bore 7 into line with the passage 2. At this time the wheel 29 is rotated again through 180° to compress the spring 17 again.

In this manner the ball 6 is only rotated when the force exerted on it by seals 9 and 10 is at a minimum. This reduces wear of these seals enormously. However, once the ball is in the desired position, the seals again bear with full force against it to prevent leakage. Since the ball floats between the seals the amount of wear on both seals will be equal. The polyimide seals can withstand temperatures to 300°C, and the other dimension changes inevitable with such heat will be compensated for by the spring 17, so that on extremely long-lined structure is created. The use of double sliders on the control rods prevents stressing of their seals.

We claim:

1. In a nuclear reactor having means for circulating a plurality of spherical fuel or breeder elements in a circulation path, the improvement which comprises a gate in said reactor along said path comprising:
    a housing formed with an elongated passage constituting part of said path;
    a fixed annular seat in said housing and lodged against a shoulder formed therein along said passage;
    a ball in said passage formed with a throughgoing bore and disposed adjacent said seat;
    means in said housing loosely connected to said ball for rotating said ball between an open position with said bore in line with said passage and a closed position with said bore transverse to said passage;
    a movable annular seal in said passage adjacent said ball and engageable therewith at a side of said ball opposite that at which said seat is provided;
    a tube in said passage abutting said seal at one end of the tube for urging same axially in the direction of said seat and against said ball, thereby gripping said ball between said seat and said seal;
    a spring in said passage seated against said tube and surrounding same;
    a sleeve surrounding said tube and engaging said spring;
    a rod rotatable in said housing and cammingly engaging said sleeve to compress said spring and urge said seal against said ball upon rotation of said rod; and
    a longitudinally extensible bellows cuff sealingly engaging the other end of said tube and connected to a fixed annular part of said housing.

2. The improvement defined in claim 1 wherein said rod has a two in-line parts, said means for urging including a double-slide between and interconnecting said parts, said double-slide having a pair of members relatively shiftable in two mutually orthogonal directions perpendicular to said axis but angularly coupled together.

3. The improvement defined in claim 1 wherein said ball is formed with a pair of radial holes, said housing being formed with a bore transverse to said passage and in line with said ball, said means for rotating said ball comprising another rod in said bore of said housing provided with a pair of pins received in said holes in said ball, whereby rotation of said other rod rotates said ball.

4. The improvement defined in claim 3 wherein said means for rotating said ball includes a further rod in said bore of said housing in line with said other rod, and a double-slide in said bore of said housing rotationally interconnecting said other and further rods, said double slide having a pair of members relatively shiftable in two mutually orthogonal directions perpendicular to said axis but angularly coupled together.

* * * * *